April 22, 1930.   W. G. BAKER   1,755,947
ANIMAL TRAP
Filed Feb. 25, 1928
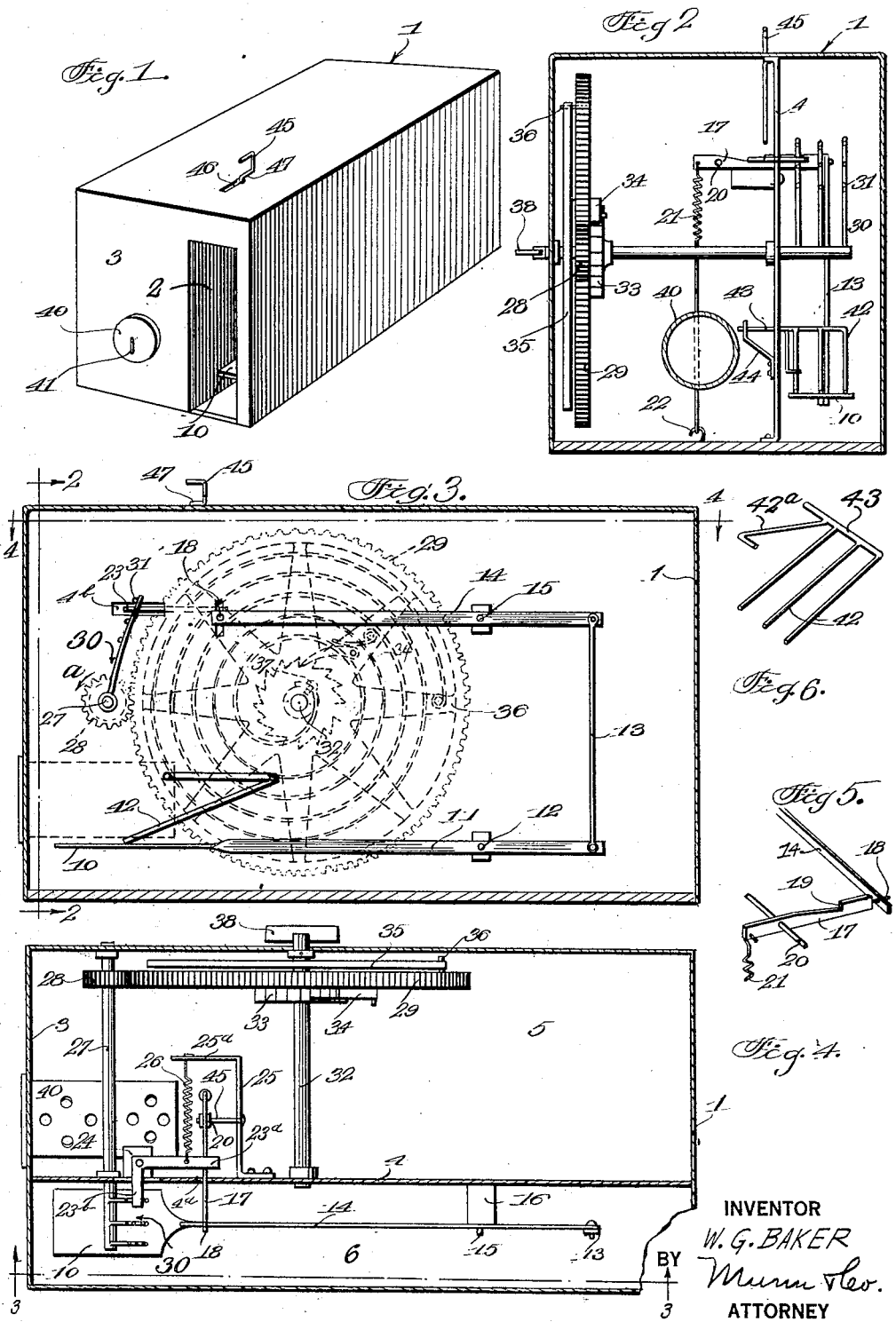
INVENTOR
W. G. BAKER
BY
ATTORNEY Patented Apr. 22, 1930

1,755,947

UNITED STATES PATENT OFFICE

WALTER G. BAKER, OF SALEM, OREGON

ANIMAL TRAP

Application filed February 25, 1928. Serial No. 256,949.

This invention relates to animal traps and more particularly to traps for catching rats and other rodents.

A primary object of the invention is to provide a trap of this character which operates automatically to kill and remove the prey and to re-set itself ready for the next victim, so that it will operate continuously as long as any animal enters it and the operating mechanism remains active.

Another object is to provide a trap of this character, which on the entering of the animal is operated by the weight of the animal, to quickly actuate a striking element to impart a sharp, forceful, killing blow on the entering animal's head, and to bring into motion ejecting means for throwing the animal so killed from the trap.

In carrying out these objects, the invention is susceptible of a wide range of modification without departing from the spirit or sacrificing any of the advantages of the claimed invention there being shown in the drawings for illustrative purposes a preferred and practical form, in which:

Figure 1 represents a perspective view of a trap constructed in accordance with this invention, taken from the front, Fig. 2 is a transverse vertical section taken on the line 2—2 of Fig. 3, Fig. 3 is a longitudinal vertical section taken on the line 3—3 of Fig. 4, Fig. 4 is a horizontal section taken on the line 4—4 of Fig. 3, Fig. 5 is a side elevation of the catch member detached, and Fig. 6 is a detail perspective view of the ejector.

In the embodiment illustrated the trap constituting this invention comprises a casing 1, here shown rectangular in form and closed throughout except for the entrance opening 2, formed in the front end 3 at one side thereof. This casing 1 is divided longitudinally by an upright partition 4 into a larger compartment 5, and a smaller entrance chamber 6 in which latter is mounted a tilting platform 10 located adjacent to the entrance of the chamber 6 and from the rear end of which extends a longitudinal bar 11 arranged in edgewise relation and fulcrumed near its rear end as shown at 12.

Rising from the rear end of the bar 11 and pivotally connected therewith is a rod or link 13 to the upper end of which is pivotally connected a lever 14 which is arranged longitudinally in the chamber 6 in a plane directly above the bar or shank 11 of the platform. This lever 14 is fulcrumed at 15 on a bracket 16 projecting laterally from the partition 4. To the front end of the lever 14 is connected a rod 17 extending through a vertically arranged slot 18 in the partition 4. This catch 17, as shown in detail in Fig. 5, has a stud 18 at one end which extends through an opening in the lever 14 and connected therewith so that when the lever is operated the catch will be operated thereby. This catch 17 extends into the compartment 5 and is there fulcrumed at 20 on a bracket 25 mounted on the partition 4, as is shown clearly in Fig. 4. The other end of this catch 17 beyond the fulcrum 20 is connected by a coiled spring 21 to a hook 22 mounted in the bottom of the chamber 5 and which spring exerts its tension to swing the catch 17 so that the end thereof connected with the lever 14 will tend to raise this lever end and through its connection with the platform 10 hold said platform in horizontal position, ready for the entrance of an animal.

A trigger in the form of a bell crank lever 23 is fulcrumed on a bracket 24 mounted on the partition 4. This trigger 23 is connected by a coiled spring 26 with one arm 25ᵃ of the bracket 25, as shown clearly in Fig. 4, and said spring 26 exerts its tension to normally swing the trigger on its fulcrum out of the path of the fingers 31 or rather out of the path of the innermost finger 31 of the striking element 30. The long arm 23ᵃ of this bell crank trigger extends over the catch rod 17 and is designed to be engaged by the notch 19 thereof to hold said trigger in the position shown in Fig. 4 against the tension of the spring 26 and with its short arm 23ᵇ engaged with one of the fingers 31 of the striking member and thereby hold said striking member in elevated position.

The striking member 30 is carried by a rotatable shaft 27 which extends transversely of the trap being journaled in the partition 4 and in one side wall of the compartment 5. Fixed to the shaft 27 is a small cogwheel 28 which meshes with a large gear wheel 29 rotatably mounted on a shaft 32 supported by the partition 4 and the outside wall of the compartment 5 as is shown clearly in Figs. 2 and 4.

Fixed to the shaft 32 adjacent the gear wheel 29 is a ratchet wheel 33 adapted to be engaged by a spring pressed pawl 34 carried by the gear 29, as is shown clearly in Figs. 2 and 4 and which operates to prevent the reverse turning of the gear 29.

A spiral spring 35 similar to the mainspring of a clock, is fixed at one end to the gear wheel 29, as shown at 36 in Fig. 3 and to the ratchet wheel hub as shown at 37, in Fig. 3.

A key 38 for winding up the spring 35 is provided, and it is, of course, understood that when this spring is wound up, that it will exert its tension to turn the gear wheel 29 in a direction to rotate the cog gear 28 in the direction of the arrow $a$ and thereby turn with it the striking element 30 which is secured to the shaft on which said cog 28 is fixed.

A bait holder 40 is shown mounted in the compartment 5 and is made in the form of a perforated cylinder closed at its inner and outer ends and having a handle 41 on its front or outer end to facilitate insertion and removal. The bait to be used is of a strong smelling variety and when inserted in the cylinder 40 and placed within the compartment 5, the odor therefrom will pass out through the apertures in said holder and attract the rats or other animals for which the trap is set.

An ejector 42 is mounted in the entrance chamber 6 at the front thereof directly over the platform 10 in rear of the point where the striker operates, so that when the animal entering is struck and killed it will be thrown onto this ejector and thrown forward thereby out of the entrance 2.

This ejector 42 is constructed as shown in detail in Fig. 6 and is made in the form of a rake the shaft 43 of which extends through the partition 4 and is journaled in said partition and in a bracket 44 mounted on the partition 4 within the chamber 5. The ejector 42 is pivotally mounted and has an arm 42$^a$ located in the path of the striker 30 so that after hitting the animal the striker continues to rotate and engages the ejector arm thereby swinging the ejector upwardly and forwardly causing it to engage and throw the dead animal from the trap.

A safety device 45 operates through the top of the casing 1 and comprises a rod operable through a slot 46 in the casing top, which is designed to be lowered into the casing in the path of the bell crank 23 to prevent the release of the striking element 30 during a shifting or handling of the trap. When it is desired to set the trap, this rod 45 is lifted and the offset portion 47 thereof rests on the outer face of the casing top as shown in Figs. 1 and 3 and thereby holds the rod out of the way of the bell crank and permits the trap to operate as above described. When it is desired to lock the trap against operation this rod is shifted in the slot 46 and dropped downward into the path of the bell crank which holds the device securely against operation.

Without further description it is thought that the features and advantages of the invention will be readily apparent to those skilled in the art, and it will of course be understood that changes in the form, proportion and minor details of construction may be resorted to, without departing from the spirit of the invention or its scope as claimed.

I claim:—

1. A trap of the class described comprising a casing having an entrance, a movable platform located within said casing, a striking element connected to be actuated by the movement of said platform, ejecting means located in rear of and operated by the striking element to receive and throw out an animal which has been struck by the striking element, and means operable by the striking element for automatically setting the trap after the ejecting means has been operated.

2. A trap of the class described comprising a casing having an entrance, a tilting platform located within said casing adjacent said entrance, a striking element located above said platform and connected to be actuated by the movement of the platform incident to the entrance of an animal, and means located adjacent said platform and in rear of said striking element to receive the body of the animal struck by the striking element and operable by the striking element to throw out the prey.

3. A trap of the class described comprising an enclosure having an entrance, a movable platform located adjacent said entrance, a striking element located over said platform and connected to be operated by the movement of the platform, an ejector positioned to receive the animal struck by the striking element and having means located in the path of said striking element whereby said ejector is operated by the striking element to throw out the carcass.

4. A trap of the class described comprising an enclosure having an entrance, a lever fulcrumed intermediate its ends and having a platform located adjacent said entrance, a link pivoted to the other end of said lever extending upwardly, another lever fulcrumed above the first mentioned lever and connected at one end with said link, a spring controlled catch member connected with said second mentioned lever to hold the platform in raised position, a trigger connected to be operated by said catch member, a striking element arranged over said platform, said striking element and trigger having inter-engaging elements whereby the striker is held in set position, and released from the trigger when the platform is depressed.

Signed at Salem in the county of Marion and State of Oregon this 18th day of Febry., A. D. 1928.

WALTER G. BAKER.